United States Patent [19]

Engel

[11] 4,253,108

[45] Feb. 24, 1981

[54] CONTROL FOR COLOR KILLER AND AUTOMATIC COLOR LIMITER

[75] Inventor: Christopher M. Engel, Arlington Heights, Ill.

[73] Assignee: Zenith Radio Corporation, Glenview, Ill.

[21] Appl. No.: 44,874

[22] Filed: Jun. 4, 1979

[51] Int. Cl.³ .............................................. H04N 9/49
[52] U.S. Cl. ....................................... 358/26; 358/27
[58] Field of Search ......................... 358/21 R, 26–28, 358/37, 40

[56] References Cited

U.S. PATENT DOCUMENTS

| | | | |
|---|---|---|---|
| 3,701,842 | 10/1972 | Kirkwood | 358/28 |
| 3,812,524 | 5/1974 | Ivas | 358/28 |
| 3,821,790 | 6/1974 | Perry | 358/28 |
| 3,982,273 | 9/1976 | Cochran | 358/28 |
| 4,106,054 | 8/1978 | Tzakis | 358/27 |

Primary Examiner—Benedict V. Safourek
Assistant Examiner—Michael Allen Masinick
Attorney, Agent, or Firm—Zenith Radio Corporation

[57] ABSTRACT

A control network and method for a color television receiver is described for enabling and disabling the limiting action of a conventional ACL (Automatic Color Limiter) circuit, for varying the threshold at which a color killer circuit inhibits reproduction of color images, or for effecting both functions simultaneously. In the preferred embodiment, the control network includes a two-position switch by which the viewer can either increase or decrease the value of a reference signal to thereby control the degree of amplification of a received color signal. An amplifier is responsive to a reduction in the amplitude of the reference signal for substantially disabling the limiting action of the ACL circuit and for causing the color killer to inhibit reproduction of color images when a relatively small amplitude color signal is received. When operation of the switch increases the amplitude of the reference signal, the amplifier responds by enabling the limiting action of the ACL circuit and causing the color killer to inhibit reproduction of color images when a relatively larger amplitude color signal is received.

15 Claims, 2 Drawing Figures

CONTROL FOR COLOR KILLER AND AUTOMATIC COLOR LIMITER

BACKGROUND OF THE INVENTION

This invention relates generally to color television receivers, and particularly to such receivers employing automatic control of color level.

Contemporary color television receivers usually include an ACC (Automatic Color Control) circuit for automatically adjusting the level of the 3.58 MHz color signal which becomes demodulated and applied to the control electrodes of a cathode ray tube. Conventionally, such ACC operation causes the controlled level of the color signal to follow the amplitude of the 3.58 MHz reference burst signal. Thus, as the received level of the reference burst varies, the level of the color signal varies accordingly.

As is well known in the art, however, transmission inconsistencies and receiver variables sometimes produce variations in the amplitude relationship between the reference burst signal and the color signal. Consequently, the displayed image can appear as oversaturated or as nearly colorless, depending on the direction of variation between the amplitude of the color signal and the reference burst signal.

To overcome the problems associated with such variations between the amplitudes of the color signal and the burst reference signal, it has been proposed to use ACC control in conjunction with an automatic color limiter which limits the amplitude of the color signal independently of the magnitude of the burst signal. Thus, for example, when the ACC operation causes the level of the color signal to be greater than desired, the automatic color limiter limits the color signal to a predetermined maximum level. When ACC operation causes the level of the color signal to be below the predetermined maximum level, the automatic color limiter does not change the amplitude of the color signal. In this manner, undesirably high levels of the color signal generated as a result of improper ACC action are compensated for. Such a system is shown, for example, in U.S. Pat. No. 4,106,054, assigned to the assignee of the present invention.

Although the system disclosed in the above-mentioned patent performs satisfactorily, it is desirable to provide a simple and inexpensive means by which the automatic color limiter can be manually enabled and disabled according to the preference of the viewer, or automatically in response to a change in the broadcast signal.

Another limitation of many conventional color receivers is that they do not include a so-called "color killer" adjustment by which a viewer can alter the point at which color signals are reproduced. Frequently, a non-adjustable color killer quenches color when a received signal either has a color component of a predetermined small amplitude or has no color component at all. However, there are circumstances in which it is desirable to permit a viewer to manually adjust the threshold point at which the color killer operates, or to automatically alter the killer threshold point when the broadcast signal undergoes a predetermined change.

As attractive as it might be to include a viewer-operable or automatic color killer adjustment and means for selectively enabling and disabling automatic color level circuits, the inclusion of two such extra controls in the receiver adds unduly to the expense of the receiver.

OBJECTS OF THE INVENTION

It is a general object of the invention to provide a simple and inexpensive control for selectively disabling and enabling the limiting action of an automatic color limiter.

It is another object of the invention to provide a simple and inexpensive control for altering the threshold at which a color killer is actuated.

It is a further object of the invention to provide such a control which both alters the threshold at which a color killer is actuated and which selectively disables or enables the limiting action of an automatic color limiter.

It is yet another object of the invention to provide a control which can be implemented with a single, two-position switch, one position of which enables automatic color limiting and sets a first color killer threshold, and another position of which disables the automatic color limiting and sets a second color killer threshold.

BRIEF DESCRIPTION OF THE FIGURES

The above-stated objects and other objects of the invention are more particularly set forth in the following detailed description and in the accompanying drawings of which.

DESCRIPTION OF THE PREFERRED EMBODIMENT

Figure 1:
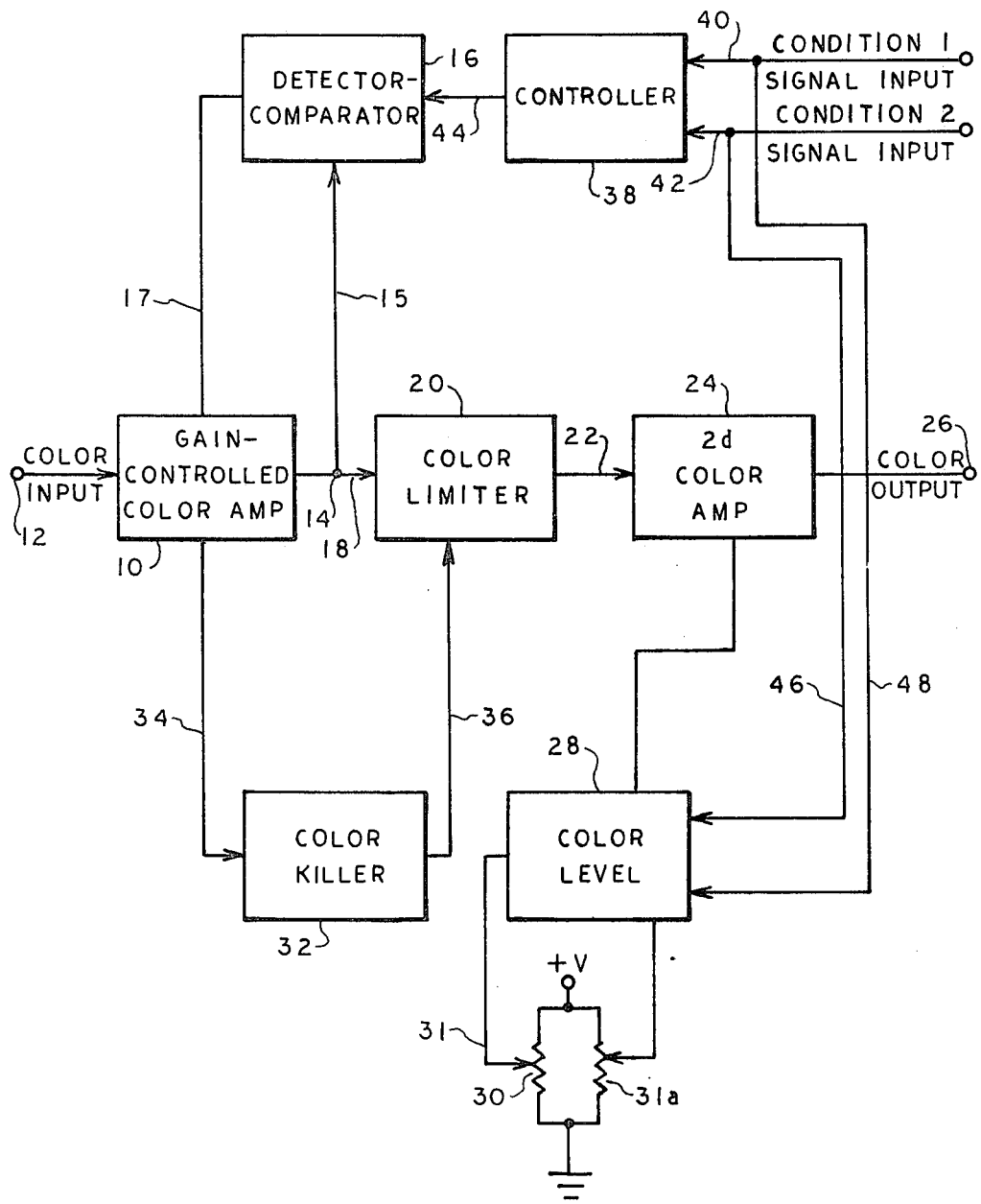
FIG. 1 depicts, in block diagram form, a system embodying various aspects of the invention.

Referring now to the drawings in which like elements are identified by like reference numerals, and referring particularly to FIG. 1, there is shown a system for enabling or disabling the limiting action of a conventional automatic color limiter circuit, for altering the point at which a color killer circuit inhibits reproduction of color images, or for effecting both functions simultaneously. As is described in more detail below, altering the operation of the automatic color limiter and the color killer may be effected manually or automatically.

As shown, the system includes a gain-controlled color signal amplifier 10 which receives at an input terminal 12 a color signal which includes as one component thereof the conventional color burst. The amplifier 10 develops an amplified color signal at its output terminal 14, the latter which is coupled via a lead 15 to the input of a detector-comparator 16. The detector-comparator 16 disposed in a color signal control loop with the amplifier 10, controls the gain of the color amplifier 10 by detecting the level of the color burst at terminal 14, comparing the detected burst level to a reference level, and generating an error signal at lead 17 indicative of the difference between the detected burst level and the reference level. The color amplifier 10 responds to the error signal on the lead 17 by varying its gain so as to hold the color burst amplitude at terminal 14 at a substantially constant level.

The terminal 14 is also coupled via a lead 18 to an ACL (Automatic Color Limiter) circuit 20 which limits the amplified color signal to a predetermined maximum level. U.S. Pat. No. 4,106,054 discloses an ACL circuit which may be used as the color limiter 20. The output of the ACL circuit 20 is coupled via a lead 22 to an input of a second color amplifier 24, the output of which is coupled to a color output terminal 26 for further processing.

To permit a viewer to manually adjust the amplitude of the signal at terminal 26, a color level control 28 is coupled to the second color amplifier 24. The control 28 is also coupled to a first variable resistance 30 whose wiper arm 31 is adjustable to control the operation of the color level control 28 and to thereby control the amplitude of the color signal at the terminal 26. Another variable resistor 31a is coupled to the color level control 28 and is described in more detail hereinafter.

Also shown in FIG. 1 is a color killer circuit 32 which is coupled to the color amplifier 10 via a lead 34 and coupled to the ACL circuit 20 via another lead 36. The color killer 32 is responsive to a signal on the lead 34 developed by the amplifier 10 to quench reproduction of color signals when the amplitude of those signals falls below a threshold value. In the embodiment shown in FIG. 1, the color killer develops a signal on the lead 36 to turn off the ACL circuit 20, thereby eliminating the color signal at the lead 22 and also at the output terminal 26.

In order to selectively disable or enable the limiting action of the ACL circuit 20, a controller 38 is included for modifying the operation of the detector-comparator 16 in response to input conditions received via leads 40 and 42. Specifically, the controller 38 responds to a first input condition received via a lead 40 for developing a reference signal of a first reference value at a lead 44 which is coupled to the detector-comparator 16, thereby to affect the value of the error signal. The first such value of the reference signal is such that the error signal developed on the lead 17 by the detector-comparator 16 controls the gain of the amplifier 10 to produce a predetermined first color burst output level at terminal 14 wherein the color signal at the latter terminal has a first predetermined output level normally below the threshold level at which the ACL circuit limits the color signal. Hence, when the controller is responsive to a condition 1 signal on the lead 40, the amplitude of the color signal at terminal 14 is reduced so that no limiting action occurs.

When a signal indicative of a second condition is received at the lead 42, the controller 38 develops a reference signal on the lead 44 of a second reference value such that the error signal on lead 17 modifies the gain of the amplifier 10 to produce a predetermined second color burst output level wherein the color signal at terminal 14 has a second predetermined higher level which exceeds the threshold level of the ACL circuit under normal signal conditions, thereby causing the ACL circuit 20 to limit the amplitude of the color signal to a predetermined maximum level.

The signals at leads 40 and 42 which are representative of conditions 1 and 2 may be developed, for example, by manipulation of a viewer actuable switch which, when thrown to one position, develops a signal at lead 40 indicative of condition 1 and, when thrown to the other position, develops at lead 42 a signal representative of condition 2. Alternately, the signals at leads 40 and 42 may be developed automatically. For example, the presence or absence of signals on leads 40 and 42 may be controlled by some condition in the broadcast signal such as VIR (Vertical Interval Reference) signal, an automatic gain control signal, by operation of a space command controller, or the like. In short, the signals on leads 40 and 42 may be developed by any mechanism, manual or automatic, which is sensitive to the need for enabling or disabling the ACL circuit 20.

Because the amplitude of the color signal at terminal 26 may vary when the inputs to the controller 38 switch from condition 1 to condition 2, it is desirable to make the color level control 28 also responsive to the status of the signals at lead 40 and 42 to hold constant the amplitude of the color signal at terminal 26. For this purpose, the signals at leads 40 and 42 are coupled to the color level control 28 via leads 46 and 48. When the signals on the leads 40 and 42 indicate a condition wherein the amplitude of the color signal at terminal 14 is increased to permit limiting by the ACL circuit 20, the color level control 28 responds by switching into circuit the variable resistor 31a which is preset to reduce the amplitude of the color signal to its previous level. For example, the color amplifier 24 may include a differential amplifier whose gain is controlled by a D.C. bias. The resistor 31a, as shown, is coupled between a positive supply voltage and ground to provide at its upper arm a pre-set D.C. voltage. The color level control 28 applies this D.C. voltage to the differential amplifier to reduce its gain. Hence, irrespective of whether the system is operating under condition 1 or condition 2, the amplitude of the color signal at terminal 26 remains substantially constant so that there is substantially no perceptible change in color level of the displayed picture.

According to another aspect of the invention, the controller 38 also operates to cause the color killer 32 to kill the color signal at either a relatively low amplitude of the input color signal at terminal 12 or at a relatively higher amplitude of the input color signal, depending upon which of the conditions the system is operating under. Specifically, when the signal on lead 40 is indicative of condition 1 operation, the reference signal generated at lead 44 causes the error signal at the lead 17 to control the gain of the amplifier 10 to produce a predetermined first color burst level wherein the color killer circuit is caused to kill the color signal at a first relatively low amplitude of the input color signal. When the controller 38 senses that condition 2 is called for, it changes the value of the reference signal at lead 44 so that the resultant error signal on lead 17 causes the gain of the amplifier 10 to be modified to produce a second color burst output level wherein the color killer 32 is caused to kill the color signal at a second relatively higher amplitude of the input color signal. Preferably, the change in the kill point of the color killer and the change in the limiting action of the ACL circuit 20 are effected simultaneously. That is, the values of the reference signal on the lead 44 cause the gain of the amplifier 10 to be modified so that the action of the ACL circuit is switched from its limiting mode to its non-limiting mode and the color killer 32 is simultaneously switched from killing at a high level of the color input to a lower level of the color input. However, the system may also be employed to change merely the point at which the color killer 32 operates. Alternately, the system may be employed merely to disable and enable the limiting action of the ACL circuit 20.

Figure 2:
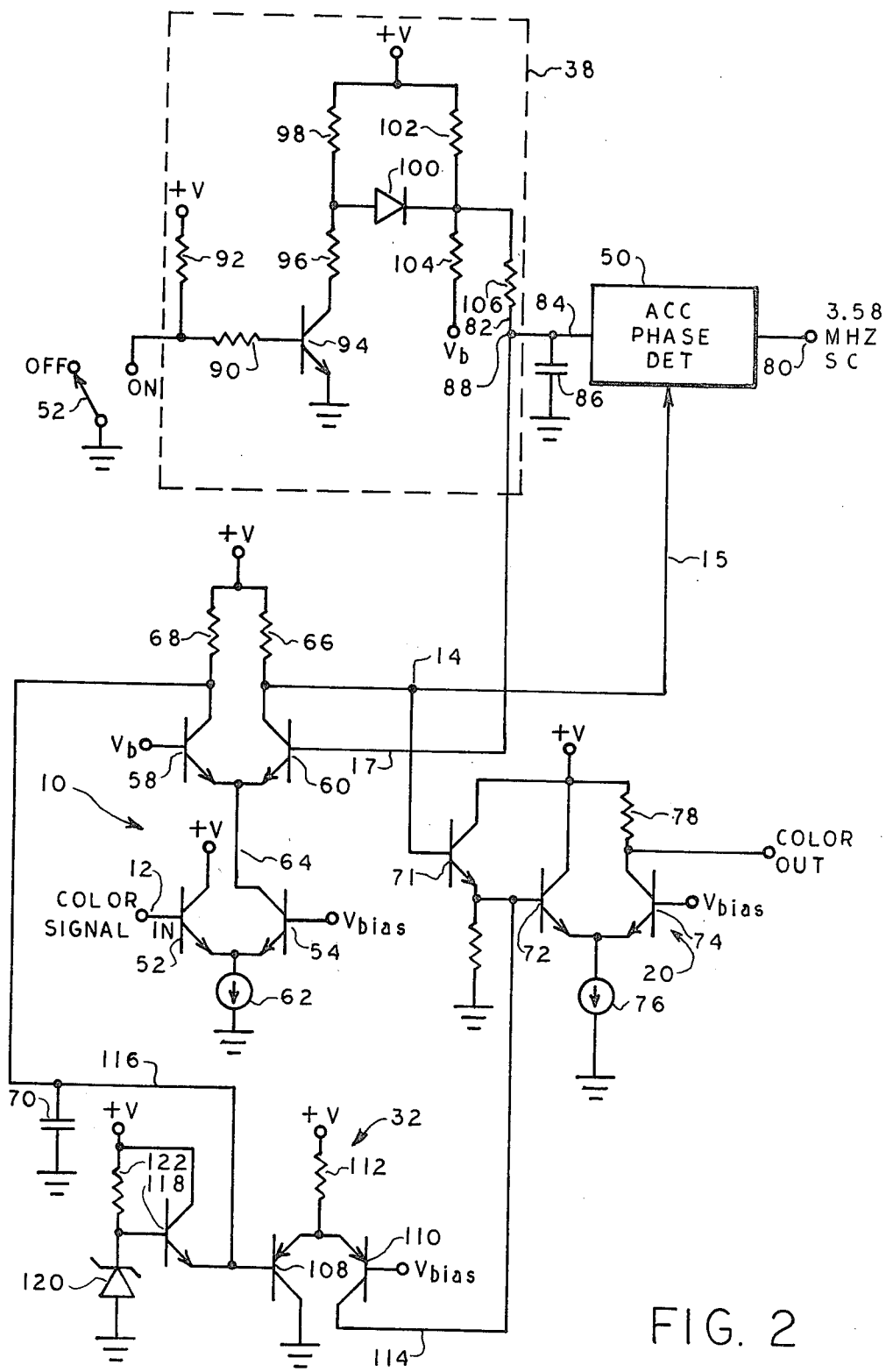
FIG. 2 is a circuit diagram depicting a preferred form of the system shown in FIG. 1.

Referring now to FIG. 2, there is shown preferred circuitry for the color amplifier 10, the ACL circuit 20, the color killer 32 and the controller 38. For clarity, the second color amplifier receiving the output of the ACL circuit 20 is not shown. In addition, the detector-comparator 16 is illustrated as a conventional ACC phase detector 50.

In the embodiment shown in FIG. 2, the controller 38 is responsive to input conditions effected by a viewer-operable, two-position switch 52. As shown, the switch 52 has an "off" position and an "on" position, each of which represent a different signal input condition to the controller 38. In a manner more fully described hereinafter, the controller 38 responds to selective positioning of the switch 52 for enabling or disabling the limiting action of the ACL circuit 20 and for altering the kill point of the color killer circuit 32.

Referring now to the amplifier 10, it includes transistors 52 and 54 interconnected as a differential amplifier and transistors 58 and 60 interconnected as another differential amplifier. The color input signal is applied to the base of the transistor 52, a D.C. bias voltage is applied to the base of the transistor 54, and a D.C. current source 62 is coupled to the emitters of the transistors 52 and 54. With this arrangement, the collector lead 64 of the transistor 54 carries a current representative of the color signal received at the input terminal 12.

The emitters of the transistors 58 and 60 are coupled to the lead 64, and both transistors are biased so as to "steer" a controlled amount of the color signal to the collector of the transistor 60, thereby to develop an amplified color signal across a load resistor 66. By varying the relative bias on the transistors 58 and 60, the amount of current steered to the load resistor 66 is varied accordingly, and the amplitude of the color signal at the terminal 14 is likewise varied.

In the illustrated embodiment, the transistor 58 is biased by a D.C. voltage $V_b$ applied to its base, and the transistor 60 is biased by a variable amplitude D.C. error voltage applied to its base via the lead 17. When the bias applied to the bases of the transistors 58 and 60 is equal, those transistors conduct equally. However, when the bias applied to the base of the transistor 60 is more positive than $V_b$, more of the current is steered through the transistor 60. Hence, the amplitude of the amplified color signal at terminal 14 is controlled by the magnitude of the error signal applied to the base of the transistor 60.

Because the collector of the transistor 58 also includes a load resistor 68, any variation in the level of conduction of the transistor 58 results in a change in the amplitude of the resultant voltage at its collector. A.C. components of that voltage are grounded through a capacitor 70 so that the filtered signal at the collector of transistor 58 is essentially a D.C. signal. In a manner to be described hereinafter, the latter signal is utilized to actuate the color killer circuit 32 for inhibiting the reproduction of color signals under certain circumstances.

Further processing of the color signal at the terminal 14 is effected by coupling that signal through an emitter-follower transistor 71 to the input of the ACL circuit 20. As shown, that circuit may include transistors 72 and 74 interconnected in a differential amplifier configuration with a current source 76 and a D.C. bias voltage applied to the base of transistor 74. The output of the ACL circuit is developed across a load resistor 78 connected to the collector of the transistor 74. Suffice it to say that the level of current supplied by the source 76 and the bias applied to the ACL circuit are selected such that the ACL circuit limits the amplitude of the color signal across the resistor 78 to a predetermined maximum. Hence, in situations where the level of the color signal received by the transistor 72 exceeds a given amplitude, the ACL circuit 20 limits the amplitude of the color signal to a selectable maximum amplitude. A more complete description of such color limiting is given in U.S. Pat. No. 4,106,054.

As stated above, there are circumstances in which a viewer may find it desirable to defeat the limiting action of the ACL circuit 20. In addition, there are other circumstances in which it is desirable to permit a viewer to manually adjust the point at which the color killer operates for inhibiting reproduction of a color signal. To satisfy both these requirements, the two-position switch 52 is operatively coupled to the conventional ACC phase detector 50, and the color killer circuit 32 is coupled to the color amplifier 10 so as to respond to changes in the output of the detector 50 as varied by operation of the switch 52.

Referring first to the ACC detector 50, it receives a 3.58 megahertz sub-carrier signal via input lead 80, a 3.58 megahertz burst signal on the lead 15 derived from the color signal amplified by the color amplifier 10, and a D.C. reference voltage on a lead 82. Operating conventionally, the detector 18 generates a control signal at a lead 84 which is filtered by a capacitor 86 and summed at a node 88 with the reference voltage on lead 82. A resultant error signal on the lead 17 biases the transistor 60 so that the output of the latter transistor is maintained at a substantially constant level despite variations in the magnitude of the color signal received at the input terminal 12. Typically, the detector 50 is capable of holding the output of the color amplifier 10 at a substantially constant level as the magnitude of the color input signal decreases by about 30 db (decibels) below a nominal level. Moreover, with this arrangement, the magnitude of the color signal on the terminal 14 is approximately proportional to the amplitude of the reference voltage on the lead 82, at least where the gain of the feedback system including the phase detector 50 and the color amplifier 10 is large, as it typically is. This relationship between the amplitude of the color signal at the terminal 14 and the reference voltage is utilized to defeat the limiting action of the ACL circuit 20 in the manner described below.

Toward this end, the switch 52 is provided with an "off" position in which the reference voltage on the lead 82 has a first value and an "on" position in which the reference voltage has a second value which is higher than the first value. More specifically, the "on" contact of the switch 52 is coupled to the junction of resistors 90 and 92, the former of which is coupled to the base of a transistor 94 whose emitter is grounded. Bias for the transistor 94 is provided by connecting the resistor 92 to a positive supply voltage.

The collector of the transistor 94 is coupled via resistors 96 and 98 to the supply voltage, with their junction coupled to the anode of a diode 100. The cathode of the diode 100 is connected to the junction of resistors 102 and 104. By applying the positive supply voltage to one end of the resistor 102 and a bias supply $V_b$ to one end of the resistor 104, a voltage divider is provided to generate the reference voltage at their junction. That reference voltage is applied to the node 88 via another resistor 106.

When it is desired to defeat the limiting action of the ACL circuit 20, the switch 52 is thrown to its "off" position. This allows the transistor 94 to be biased on to saturation, thereby lowering the voltage at the junction of the resistors 96 and 98 to a point where the diode 100 is non-conductive. Consequently, the reference voltage is determined by the values of the resistors 102 and 104 and the magnitudes of the supply voltage and the bias voltage $V_b$. The reference voltage is now relatively low, wherefore the error signal on the lead 17 and the gain of the color amplifier 10 are correspondingly low. Consequently, the magnitude of the amplified color signal at the terminal 14 is not great enough to overdrive the ACL circuit 20. Thus, the color output signal across the resistor 78 is not limited.

When the limiting action of the ACL circuit is desired, the switch 52 is thrown to its "on" position, thereby grounding the resistor 92 and removing the bias from the transistor 94. The voltage at the junction of the resistors 96 and 98 rises sufficiently to render the diode 100 conductive, and the current through the diode increases the voltage at the junction of the resistors 102 and 104. Hence, the reference voltage increases, the error voltage increases, and the gain of the color amplifier 10 increases sufficiently to cause the color signal on the terminal 14 to overdrive the ACL circuit. The latter circuit then limits the amplitude of the color signal appearing across the resistor 78. Preferably, the change in the reference voltage is selected so as to effect approximately 6 db in gain reduction when the switch 52 is thrown from its "on" position to its "off" position.

The effect which a change in the amplitude of the reference voltage has on the color amplifier 10 is also employed to change the threshold at which the color killer circuit 32 is actuated. To appreciate the way in which the threshold of the color killer circuit is altered, it should be understood that the feedback system of the ACC phase detector 50 and the color amplifier 10 can hold the output of the amplifier 10 at a relatively constant level only over a finite range. Typically, that range is about 30 db. When the amplitude of the color input signal at terminal 12 is reduced beyond 30 db, the output signal at terminal 14 is correspondingly reduced. However, the color killer circuit 32 is designed to quench color reproduction at a point just above the 30 db level. Hence, for all practical purposes, a viewer will not notice any substantial gradual change in the level of the reproduced color image. Color is simply "on" above the threshold of the color killer circuit or "off" below that threshold.

It should also be recognized that when the switch 52 is in its "on" position, the increased gain of the color amplifier 10 is obtained at the expense of part of the ACC range. For example, where the gain of the color ampliifer 10 is increased by 6 db by throwing the switch 52 from its "off" position to its "on" position, 6 db of the ACC range is lost. As a result, a 24 db reduction in the amplitude of the color signal received at the terminal 12 will exhaust the ACC range and trigger the color killer circuit 32. On the other hand, when the switch 52 is thrown from its "on" position to its "off" position, the gain of the color amplifier 10 is reduced by 6 db but an additional 6 db of ACC range is recaptured. Hence, the color signal received at the terminal 12 must drop by 30 db before the ACC range is exhausted and the threshold of the color killer circuit is reached.

The ability to change the threshold at which the color killer circuit 32 is triggered is useful in the following exemplary situations. Assume, for example, that the television receiver receives a black and white telecast in which the reference 3.58 megahertz burst has not been completely removed. If the burst level is great enough, the color killer will not be triggered. Consequently, noise passing through the color amplifier 10 and the ACL circuit 20 will be visible on the screen. That noise can be eliminated by throwing the switch 52 to its "on" position to exhaust 6 db of the ACC range. Hence, if the level of the received burst is below 24 db, the color killer circuit 32 will be triggered to quench color reproduction.

In a condition where a color telecast is received but the level of the burst is between the 24 db and 30 db levels, a viewer may want color reproduction continued even though the reproduced image may be noisy. By throwing the switch 52 to its "off" position, 6 db of the ACC range is recaptured and the color killer threshold is effectively lowered from 24 db to 30 db. Hence, color reproduction is enabled.

To obtain the results described above, the color killer circuit 32 includes PNP transistors 108 and 110 interconnected as a differential amplifier, their emitters being coupled to a positive supply voltage via a resistor 112. The base of the transistor 110 is coupled to a D.C. bias voltage and its collector is coupled via a lead 114 to the emitter of the transistor 71.

The base of the transistor 108 is coupled to the collector of the transistor 58 by a lead 116 and to the emitter of another transistor 118. The base of the transistor 118 is coupled to ground through a zener diode 120 and to a positive supply voltage through a resistor 122. The zener diode 120 and the transistor 118 serve as a clamp which holds the collector of the transistor 58 to a minimum voltage level to avoid its being driven into saturation when it conducts heavily.

To explain the operation of the color killer circuit 32, it is assumed that the switch 52 is in its "off" position and that a low level color signal having an amplitude just above the 30 db point is received. The error voltage on the lead 17 causes most of the color current from transistor 54 to be steered through the transistor 60 to provide large amplification of the received color signal. Hence, the transistor 58 conducts very little current, as a result of which the bias on the transistor 108 is just sufficient to keep it conductive. Further reduction in the level of the received color signal results in further reduction in the current through the transistor 58, lowering the bias on the transistor 108, reducing its conduction, and causing the transistor 110 to conduct more heavily. If the received color signal drops below the 30 db point, the transistor 110 conducts heavily enough to reverse bias the transistor 72, thereby removing the color signal from the ACL circuit 20 and quenching color reproduction. Thus, the transistors 108 and 110 operate as a switch to turn off the transistor 72 when the amplitude of the received color signal goes below a threshold point. Conversely, an increase in the amplitude of the received color signal causes the transistors 108 and 110 to turn transistor 71 on to permit color reproduction.

When the switch 52 is in its "on" position, the transistors 108 and 110 operate as described above except that they turn the transistor 71 off when the received color signal is at the 24 db point rather than the 30 db point. Hence, throwing the switch 52 to its "on" position may be said to reduce the threshold or actuating point of the color killer circuit by 6 db.

With the preferred circuit described above, the switch 52 serves a dual purpose; it controls the gain of the color amplifier so as to defeat or enable the limiting action of the ACL circuit as desired; it also serves to give the viewer control over the "kill point" of the color killer circuit. Hence, those two unrelated functions are provided by a single, viewer operable switch control and an inexpensive control network.

Although the invention has been described in terms of a preferred structure, it will be obvious to those skilled in the art that many modifications and variations thereof may be made without departing from the invention. For example, the circuitry which modifies the reference voltage in response to a change in the position of the switch 52 may take other forms. Also, the range over which the threshold of the color killer circuit is changed and the ACL circuit is enabled is not limited to 6 db. Other ranges may be employed as desired. Accordingly, it is intended that all such modifications and alterations be included within the spirit and scope of the invention as defined by the appended claims.

What is claimed is:

1. In a color television receiver, an improved color limiting system, comprising:
   a gain-controlled color signal amplifier for receiving and amplifying an input color signal, which signal includes as a component a color burst;
   an automatic color limiter coupled to the output of said amplifier for automatically limiting the maximum amplitude of the amplified color signal when the amplitude thereof exceeds a predetermined threshold level;
   an automatic color signal control loop including detecting and comparing means responsive to the color burst level at the output of said amplifier and responsive to a reference signal for developing an error signal to control the gain of said amplifier;
   means providing a control signal having first and second selectable conditions;
   control means for developing the reference signal and responsive to the first condition of said control signal for causing said reference signal to assume a first reference value such that the error signal developed by said detecting and comparing means controls the gain of said amplifier to produce a predetermined first color burst output level wherein said color signal at the output of said gain-controlled amplifier has a first predetermined output level normally below said threshold level at which said limiter limits said color signal,
   said control means being responsive to the second condition of said control signal for causing said reference signal to assume a second reference value such that the error signal developed by said detecting and comparing means modifies the gain of said amplifier to produce a predetermined second color burst output level wherein said color signal at the output of said amplifier has a second predetermined higher level which exceeds said threshold level under normal signal conditions to cause said color signal to be limited; and
   means coupled to the output of said color limiter and responsive to said second condition of the control signal for attenuating said color signal so as to maintain substantially unchanged the perceived color level in the displayed picture.

2. In a color television receiver, an improved color killing system, comprising:
   a gain-controlled color signal amplifier for receiving and amplifying an input color signal, which signal includes as a component a color burst;
   a color killer circuit responsive to the gain of said amplifier for killing the amplified color signal when the amplitude of the input color signal falls below a predetermined kill level;
   an automatic color signal control loop including detecting and comparing means responsive to the color burst level at the output of said amplifier and responsive to a reference signal for developing an error signal to control the gain of said amplifier;
   means providing a control signal having first and second selectable conditions;
   control means for developing the reference signal and responsive to the first condition of said control signal for causing said reference signal to assume a first reference value such that the error signal developed by said detecting and comparing means controls the gain of said amplifier to produce a predetermined first color burst output level wherein said color killer circuit is caused to kill said color signal at a first, relatively low amplitude of the input color signal,
   said control means being responsive to the second condition of said control signal for causing said reference signal to assume a second reference value such that the error signal modifies the gain of said amplifier to produce a predetermined second color burst output level wherein said color killer circuit is caused to kill said color signal at a second, relatively higher amplitude of said input color signal.

3. In a color television receiver, an improved color killing and color limiting system, comprising:
   a gain-controlled color signal amplifier for receiving and amplifying an input color signal, which signal includes as a component a color burst;
   an automatic color limiter coupled to the output of said amplifier for automatically limiting the maximum amplitude of the amplified color signal when the amplitude thereof exceeds a predetermined threshold level;
   a color killer circuit responsive to the gain of said amplifier for killing the amplified color signal when the amplitude of the input color signal falls below a predetermined kill level;
   an automatic color signal control loop including detecting and comparing means responsive to the color burst level at the output of said amplifier and responsive to a reference signal for developing an error signal to control the gain of said amplifier;
   means providing a control signal having first and second selectable conditions;
   control means for developing the reference signal and responsive to the first condition of said control signal for causing said reference signal to assume a first reference value such that the error signal developed by said detecting and comparing means controls the gains of said amplifier to produce a predetermined first color burst output level wherein:
      (1) said color signal at the output of said amplifier has a first predetermined output level normally below said threshold level at which said limiter limits said color signal, and
      (2) said color killer circuit is caused to kill said color signal at a first, relatively low amplitude of the input color signal, and
   said control means being response to the second condition of said control signal for causing said reference signal to assume a second reference value such that the error signal developed by said detecting and comparing means modifies the gain of said amplifier to produce a predetermined second color burst output level wherein:

(1) said color signal at the output of said amplifier has a second predetermined higher level which may exceed said threshold level under normal signal conditions, and (2) said color killer circuit is caused to kill said color signal at a second, relatively higher amplitude of said input color signal; and means coupled to the output of said color limiter and responsive to said second input condition for attenuating said color signal such as to maintain substantially unchanged the perceived color level in the displayed picture.

4. In a color television receiver having a color killer which is actuatable to inhibit the reproduction of color images, having an ACC detector for development of an error signal to control the amplification of an input color signal, and having an automatic color limiter receiving the amplified input color signal for limiting the maximum amplitude thereof, a network for selectivity enabling and disabling the limiting action of the automatic color limiter and for simultaneously adjusting the threshold at which the color killer is actuated, comprising:

control means including a two-position switch for developing a reference signal of a first predetermined value when the switch is in a first position and a reference signal of a second predetermined value when the switch is in a second position, including means for modifying the error signal as a function of the value of the reference signal;

amplifier means responsive to the error signal for substantially disabling the limiting action of the automatic color limiter and for causing the color killer to inhibit reproduction of color images at a first, relatively low amplitude of the input color signal when the reference signal is of the first predetermined value, and responsive to the error signal for enabling the limiting action of the automatic color limiter and for causing the color killer to inhibit reproduction of color images at a second, relatively higher amplitude of the input color signal when the reference signal is of the second predetermined value, whereby a viewer is able to disable or enable the limiting action of the automatic color limiter and to change the threshold at which the color killer is actuated by a single switch.

5. A network as set forth in claim 4 wherein said amplifier means is a variable-gain color amplifier receiving the input color signal for generating the amplified color signal for application to the automatic color limiter, and wherein said color amplifier is responsive to the error signal for reducing the amplitude of the amplified color signal sufficiently to preclude limiting action by the automatic color limiter when the reference signal is of the first predetermined value, and is responsive to the error signal for increasing the amplitude of the amplified color signal sufficiently to permit limiting action by the automatic color limiter when the reference signal is of the second predetermined value.

6. A network as set forth in claim 5 wherein the color killer is actuatable by a killer signal of a predetermined threshold level, and wherein said color amplifier is responsive to the error signal for establishing the killer signal at said threshold at a first, relatively low amplitude of the input color signal when the reference signal is of the first predetermined value, and responsive to the error signal for establishing the killer signal at said threshold at a second, relatively high level of the input color signal when the reference signal is of the second predetermined value.

7. A network as set forth in claim 6 wherein said control means is adapted to modify the error signal such that the gain of the color amplifier is increased by approximately 6 db when said switch is thrown from said first to said second position.

8. A network as set forth in claim 6 wherein said color amplifier comprises a differential amplifier having one input for receiving the error signal, one output at which the amplified color signal is developed, and another output at which the killer signal is developed.

9. A network as set forth in claim 5 wherein the ACC detector generates a control signal and wherein said control means sums the control signal with the reference signal to develop the error signal, and including means for coupling the error signal to said color amplifier.

10. A network as set forth in claim 9 wherein said control means includes a voltage divider for establishing the reference signal at a first value, a diode coupled to said voltage divider and adapted to be turned off and on for conducting current through said voltage divider to change the value of the reference voltage when said diode is on, and a transistor coupled to said diode and adapted to turn said diode off and on in response to said switch being thrown between said first and second positions.

11. In a color television receiver having a color killer which is actuatable to inhibit the reproduction of color images, having an ACC detector for generating a control signal to vary the amplification of an input color signal, and having an automatic color limiter receiving the amplified input color signal for limiting the maximum amplitude thereof, a network for selectively enabling and disabling the limiting action of the automatic color limiter and for simultaneously adjusting the threshold at which the color killer is actuated, comprising:

control means including a two-position switch for developing a reference signal of a first, relatively low value when said switch is in a first position and a reference signal of a second, relatively high value when said switch is in a second position, and including means for summing said reference voltage with the control voltage to generate an error signal;

a variable-gain differential amplifier receiving the input color signal and the error signal for generating an amplified color signal for application to the automatic color limiter and for generating a killer signal for actuating the color killer, said amplifier being responsive to the error signal generated when said switch is in said first position for amplifying the color signal at a sufficiently low level to preclude limiting action by the automatic color limiter and for generating a killer signal for actuating the color killer at a first, relatively low amplitude of the input color signal, and being responsive to the error signal generated when said switch is in said second position for amplifying the color signal at a sufficiently high level to enable limiting action by the automatic color limiter and for generating a killer signal for actuating the color killer at a second, relatively high amplitude of the input color signal, whereby a viewer is able to disable or enable the limiting action of the automatic color limiter and to change the threshold at which the color killer is actuated by a single switch.

12. A network as set forth in claim 11 wherein said control means includes a voltage divider for establishing the reference signal at a first value, a diode coupled to said voltage divider and adapted to be turned off and on for conducting current through said voltage divider to change the value of the reference voltage when said diode is on, and a transistor coupled to said diode and adapted to turn said diode off and on in response to said switch being thrown between said first and second positions.

13. In a color television receiver having a gain-controlled color signal amplifier receiving an error signal and a color input signal containing a color burst component for amplifying the color signal as a function of the value of the error signal, and having an automatic color limiter coupled to the output of the color signal amplifier for automatically limiting the maximum amplitude of the amplified color signal when the amplitude of the amplified color signal exceeds a predetermined threshold, a method of disabling and enabling the limiting action of the automatic color limiter, comprising:

developing the error signal as a function of the color burst level at the output of the color signal amplifier and as a function of a reference signal;

establishing the reference signal at a first predetermined value such that the error signal controls the gain of the color signal amplifier to produce a predetermined first color burst output level wherein the color signal at the output of the color signal amplifier has a first predetermined output level normally below said threshold level at which the limiter limits the amplified color signal; and establishing the reference signal at a second predetermined value such that the error signal modifies the gain of the color signal amplifier to produce a predetermined second color burst output level wherein the color signal at the output of the color signal amplifier has a second predetermined higher output level which exceeds the threshold level of the limiter under normal signal conditions to cause the amplified color signal to be limited; and attenuating the output of the color limiter when the reference signal is at its second predetermined value so as to maintain substantially unchanged the perceived color level in the displayed picture.

14. In a color television receiver having a gain-controlled color signal amplifier receiving an error signal and a color input signal containing a color burst component for amplifying the color signal as a function of the value of the error signal, and having a color killer circuit responsive to the color signal for killing the color signal when the amplitude thereof falls below a predetermined kill level, a method of adjusting the kill point of the color killer circuit, comprising:

developing the error signal as a function of the color burst level at the output of the color signal amplifier and as a function of a reference signal;

establishing the reference signal at a first predetermined value such that the error signal controls the gain of the color signal amplifier to produce a predetermined first color burst output level wherein said color killer circuit is caused to kill said color signal at a first, relatively low amplitude of the input color signal; and selectively establishing the reference signal at a second predetermined value such that the error signal modifies the gain of the color signal amplifier to produce a predetermined second color burst output level wherein the color killer circuit is caused to kill the color signal at a second, relatively higher amplitude of the input color signal.

15. In a color television receiver having a gain-controlled color signal amplifier receiving an error signal and a color input signal containing a color burst component for amplifying the color signal as a function of the value of the error signal, having a color killer circuit responsive to the color signal for killing the color signal when the amplitude thereof falls below a predetermined kill level, and an automatic color limiter coupled to the output of the color signal amplifier for automatically limiting the amplified color signal when the amplitude thereof exceeds a predetermined threshold, a method of adjusting the kill point of the color killer circuit and simultaneously disabling and enabling the limiting action of the automatic color limiter, comprising:

developing the error signal as a function of the color burst level at the output of the color signal amplifier and as a function of a reference signal;

establishing the reference signal at a first predetermined value such that the error signal controls the gain of the color signal amplifier to produce a predetermined first color burst output level wherein:

(1) the color signal at the output of the color signal amplifier has a first predetermined output level normally below the threshold level at which the limiter limits the color signal; and (2) the color killer circuit is caused to kill the color signal at a first, relatively low amplitude of the input color signal; and selectively establishing the reference signal at a second, predetermined value such that the error signal modifies the gain of the color signal amplifier to produce a predetermined, second color burst output level wherein:

(1) the color signal at the output of the color signal amplifier has a second predetermined higher level which exceeds said threshold level under normal signal conditions, and (2) the color killer circuit is caused to kill the color signal at a second, relatively higher amplitude of the input color signal; and attenuating the output of the color limiter when the reference signal is at its second predetermined value so as to maintain substantially unchanged the perceived color level in the displayed picture.

* * * * *